(12) United States Patent
Nasiri et al.

(10) Patent No.: US 7,677,099 B2
(45) Date of Patent: Mar. 16, 2010

(54) INTEGRATED MICROELECTROMECHANICAL SYSTEMS (MEMS) VIBRATING MASS Z-AXIS RATE SENSOR

(75) Inventors: Steven Nasiri, Saratoga, CA (US); Joe Seeger, Menlo Park, CA (US); Bruno Borovic, San Francisco, CA (US)

(73) Assignee: Invensense Inc., Sunnyvale, CA (US)

( * ) Notice: Subject to any disclaimer, the term of this patent is extended or adjusted under 35 U.S.C. 154(b) by 46 days.

(21) Appl. No.: 11/935,357

(22) Filed: Nov. 5, 2007

(65) Prior Publication Data

US 2009/0114016 A1    May 7, 2009

(51) Int. Cl.
*G01P 9/04* (2006.01)
*G01C 19/00* (2006.01)
(52) U.S. Cl. ............... 73/504.12; 73/504.14; 73/504.04
(58) Field of Classification Search ............... 73/504.12, 73/504.04, 504.02, 504.13, 504.14, 504.15, 73/504.16, 493
See application file for complete search history.

(56) References Cited

U.S. PATENT DOCUMENTS

| | | | | |
|---|---|---|---|---|
| 5,635,638 | A * | 6/1997 | Geen | 73/504.04 |
| 5,992,233 | A * | 11/1999 | Clark | 73/514.35 |
| 6,122,961 | A | 9/2000 | Geen | |
| 6,134,961 | A * | 10/2000 | Touge et al. | 73/504.12 |
| 6,189,381 | B1 | 2/2001 | Huang et al. | |
| 6,250,156 | B1 * | 6/2001 | Seshia et al. | 73/504.12 |
| 6,250,157 | B1 | 6/2001 | Touge | |
| 6,370,937 | B2 | 4/2002 | Hsu | |
| 6,823,733 | B2 * | 11/2004 | Ichinose | 73/504.02 |
| 6,845,669 | B2 | 1/2005 | Acar et al. | |
| 6,860,150 | B2 * | 3/2005 | Cho | 73/504.12 |
| 6,892,575 | B2 * | 5/2005 | Nasiri et al. | 73/504.12 |
| 6,918,298 | B2 | 7/2005 | Park | |
| 6,939,473 | B2 * | 9/2005 | Nasiri et al. | 216/2 |
| 7,036,372 | B2 | 5/2006 | Chojnacki et al. | |
| 7,240,552 | B2 | 7/2007 | Acar et al. | |
| 2005/0066728 | A1 | 3/2005 | Chojnacki | |
| 2005/0072231 | A1 | 4/2005 | Chojnacki | |
| 2006/0219006 | A1 | 10/2006 | Nasiri et al. | |
| 2008/0115579 | A1 * | 5/2008 | Seeger et al. | 73/504.12 |

* cited by examiner

*Primary Examiner*—Helen C. Kwok
(74) *Attorney, Agent, or Firm*—Sawyer Law Group, P.C.

(57) ABSTRACT

A sensor that measures angular velocity about an axis that is normal to a sensing plane of the sensor. The sensor comprises a sensing subassembly that includes a planar frame parallel to the sensing plane, a first proof mass disposed in the sensing plane, a second proof mass disposed in the sensing plane laterally to the first proof mass, and a linkage within the frame and connected to the frame. The linkage is connected to the first proof mass and to the second proof mass. The sensor further includes actuator for driving the first proof mass and the second proof mass into oscillation along a drive axis in the sensing plane. The sensor further includes a first transducer to sense motion of the frame in response to a Coriolis force acting on the oscillating first proof mass and the oscillating second proof mass.

28 Claims, 12 Drawing Sheets

INTEGRATED MICROELECTROMECHANICAL SYSTEMS (MEMS) VIBRATING MASS Z-AXIS RATE SENSOR

FIELD OF THE INVENTION

The present invention relates to microelectromechanical systems (MEMS) devices.

BACKGROUND OF THE INVENTION

Microelectromechanical systems (MEMS) technology has been under steady development for some time, and as a result various MEMS devices (including gyroscopes) have been implemented within several applications. MEMS gyroscopes generally belong to a vibratory mass class of gyroscopes. The vibratory MEMS gyroscopes are the devices used to measure rate of rotation. In general, there are two sub-classes of vibratory mass gyroscopes: (1) in-plane rotation sensors (also referred to as "X/Y rate sensors"), and (2) perpendicular-to-the-plane rate sensors (also referred to as "Z-axis (angular) rate sensors"). Although X/Y rate sensors and Z-axis rate sensors operate in accordance with the same principals, there are fundamental design differences between the two classes of gyroscopes—e.g., structural designs associated with one class cannot be easily extended to the other class.

A fundamental challenge with design of MEMS Z-axis rate sensors is to develop dual mass vibrating masses that vibrate 180 degrees out of phase, and develop ability to capacitively sense a Coriolis force exerted on the vibrating masses through sensing a motion of a rotating frame around the Z-axis. When sensing the Coriolis force it is desirable to minimize any quadrature effects—e.g., the coupling of the drive vibration to the sense frame—in order to have a good signal to noise ratio. Another challenge of designing MEMS Z-axis rate sensors is achieving a design that permits such sensors to be fabricated in high volumes and with low costs to address consumer market needs and address high volume applications (e.g., gaming applications, GPS assist applications, and mobile handset applications, and so on). Yet other desired design objectives are to provide for a reduced (e.g., minimal to none) sensitivity to linear vibrations, and also a robust design that can with stand high level of shock, e.g., due to a product being dropped.

Today, the costs associated with conventional Z-axis rate sensors are generally prohibitive for any use in the consumer market, and conventional Z-axis rate sensors also are not the most efficient in terms of size and power consumption. A main factor associated with the cost of a MEMS Z-axis rate sensor is the packaging associated with the MEMS Z-axis rate sensor. Conventional MEMS gyroscope solutions typically rely on hermetic ceramic packages having a controlled ambient in vacuum to deliver a required performance. It is virtually impossible to deliver to the consumer market a MEMS Z-axis rate sensor that meets cost/performance requirements without addressing packaging cost issues.

BRIEF SUMMARY OF THE INVENTION

In general, in one aspect, this specification describes a sensor configured to measure angular velocity about an axis that is normal to a sensing plane of the sensor. The sensor comprises a sensing subassembly that includes a substantially planar frame parallel to the sensing plane, a first proof mass disposed in the sensing plane, a second proof mass disposed in the sensing plane laterally to the first proof mass, and a linkage within the frame and connected to the frame. The linkage is connected to the first proof mass and to the second proof mass. The sensor further includes actuator for driving the first proof mass and the second proof mass into oscillation along a drive axis in the sensing plane. The actuator drives the first proof mass and the second proof mass 180 degrees out-of-phase. The sensor further includes a first transducer to sense motion of the frame in response to a Coriolis force acting on the oscillating first proof mass and the oscillating second proof mass, and a base plate which is parallel to the sensing plane and to which the sensing subassembly is attached.

Implementations can include one or more of the following features. The actuator can comprise an electrostatic actuator. The first transducer can comprise a capacitive sensor. The capacitive sensor can comprise a plurality of interdigitated comb electrodes configured to differentially measure motion of the frame. The capacitive sensor can comprise a plurality of parallel plate electrodes configured to differentially measure motion of the frame. The sensor can further include a plurality of flexures configured to connect the base plate to the frame such that the frame is able to rotate about a central axis normal to the sensing plane. The sensor can further include coupling between the linkage and the first proof mass and coupling between the linkage and the second proof mass that are compliant along the drive axis. The sensor can further include coupling between the linkage and the frame that is compliant along the drive axis. The first proof mass and the second proof mass can be coupled to the frame. The sensing subassembly can further include a first actuator mass within the frame and coupled to the first proof mass, and a second actuator mass within the frame and coupled to the second proof mass. The actuator can respectively drive the first proof mass and the second proof mass into oscillation indirectly through the first actuator mass and the second actuator mass. The first actuator mass can be coupled to the base plate and the second actuator mass can be coupled to the base plate. The first actuator mass can be coupled to the frame and the second actuator mass can be coupled to the frame. The first actuator mass can be rotatable around a first axis normal to the sensing plane and be able to move along the drive axis, and the second actuator mass can be rotatable around a second axis normal to the sensing plane and be able to move along the drive axis.

Coupling from the first proof mass to the linkage and coupling from the second proof mass to the linkage can be compliant with respect to the rotation around the axis normal to the sensing plane. The sensor can further include a first spring system and a second spring system configured to respectively amplify a substantially small oscillation of the first actuator mass and the second actuator mass into a substantially larger oscillation of the first proof mass and the second proof mass. The first actuator mass and the second actuator mass can substantially move only along the drive axis. The first proof mass can be rigidly coupled to the first actuator mass along the drive axis such that the first actuator and the first proof mass move substantially together, and the second proof mass can be rigidly coupled to the second actuator mass along the drive axis such that the second actuator and the second proof mass move substantially together. The first proof mass can be coupled to the first actuator mass such the first proof mass is rotatable around the drive axis, and the second proof mass can be coupled to the second actuator mass such the second proof mass is rotatable around the drive axis. The coupling from the first proof mass to the linkage and the coupling from the second proof mass to the linkage can be rigid with respect to the rotation around an axis normal to the sensing plane.

The actuator can comprise a plurality of differential drive electrodes or a plurality of single-ended drive electrodes. The sensing subassembly can further comprise a second transducer to sense the amplitude of the oscillation of the first proof mass and the second proof mass and provide feedback to the actuator for driving the oscillation of the first proof mass and the second proof mass at a resonant frequency. The second transducer can be capacitive. The frame can be substantially circular or rectangular. The base plate can comprise a single crystal silicon wafer. The base plate can comprise an integrated CMOS wafer having drive and sense electronics. The sensing subassembly can further comprise a cover plate including a layer of insulator. The cover plate can be attached to the sensing subassembly to form a complete hermetic seal enclosure of the first proof mass and the second proof mass. The sensor can further include anchors to anchor the sensing subassembly to the cover plate. The sensing subassembly can include a seal ring that hermetically seals the sensing subassembly to the CMOS wafer via eutectic or metal bonding while maintaining a fixed gap between the base plate and the CMOS wafer. The sensing subassembly can further include a plurality of stand offs that permit creation of electrical interconnects from the sensing subassembly to the CMOS wafer. The electrical interconnects can be formed by the eutectic or metal bonding. The eutectic or metal bonding can comprise an aluminum and germanium alloy.

Implementations can provide one or more of the following features. The plurality of sense electrodes comprise a plurality of interdigitated comb electrodes or a plurality of parallel plate electrodes. The substrate structure can further include a first actuator mass coupled to the first proof mass, and include a second actuator mass coupled to the second proof mass. The drive electrodes can respectively drive the first proof mass and the second proof mass into oscillation indirectly through the first actuator mass and the second actuator mass. The first actuator mass can be flexibly coupled to the first proof mass through a first spring system. The second actuator mass can be flexibly coupled to the third proof mass through a second spring system. The spring systems arranged in this way can respectively amplify an oscillation of the first actuator mass and the second actuator mass into a larger oscillation of the first proof mass and the second proof mass. The first actuator mass can be rigidly coupled to the first proof mass through a third spring system. The second actuator mass can be rigidly coupled to the third proof mass through a fourth spring system. The third spring system and the fourth spring system can respectively maintain a same magnitude oscillation on the first proof mass and the second proof mass as that on the third proof mass and the fourth proof mass. The drive electrodes can be differential or single-ended. The substrate structure can further include capacitive sensors embedded within the substrate structure. The capacitive sensors can sense an amplitude of the oscillation of the first proof mass and the second proof mass and provide feedback to the drive electrodes for driving the oscillation of the first proof mass and the second proof mass at a resonant frequency. The frame can be substantially circular or rectangular. The base plate can comprise a single crystal silicon wafer. The base plate can comprise an integrated CMOS wafer having drive and sense electronics.

The angular rate sensor can further include a cover plate including a layer of insulator. The cover plate can be attached to the device layer structure to form a complete hermetic seal enclosure of the first proof mass and the second proof mass. The device layer structure can include a seal ring that hermetically seals the device layer structure to CMOS wafer via eutectic or metal bonding while maintaining a fixed gap between the device layer structure and the CMOS wafer. The device layer structure can further include a plurality of stand offs that permit creation of electrical interconnects from the device layer structure to the CMOS wafer. The electrical interconnects can be formed by the eutectic or metal bonding. The eutectic or metal bonding can comprise an aluminum and germanium alloy. The angular rate sensor can further include a cover plate including a layer of insulator. The cover plate can be attached to the device layer structure to form a complete hermetic seal enclosure of the first proof mass and the second proof mass. The angular rate sensor can further include anchors to anchor the frame to the cover plate.

Implementations can provide one or more of the following advantages. In one aspect, a MEMS Z-axis rate sensor is provided that achieves appropriate performance levels by addressing quadrature issues by design. Thus, in one implementation, drive mechanisms are constrained to provide a driving motion (of a proof mass) only in a desired axis and while restricting any driving motion in any other axis, in particular the sense axis. The MEMS Z-axis rate sensor designs provided herein deliver the performance and high yield requirements sufficient for high volume production.

The details of one or more implementations are set forth in the accompanying drawings and the description below. Other features and advantages will be apparent from the description and drawings.

The details of one or more implementations are set forth in the accompanying drawings and the description below. Other features and advantages will be apparent from the description and drawings.

BRIEF DESCRIPTION OF THE DRAWINGS

Like reference symbols in the various drawings indicate like elements.

DETAILED DESCRIPTION OF THE INVENTION

The present invention relates generally to microelectromechanical systems (MEMS) devices. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
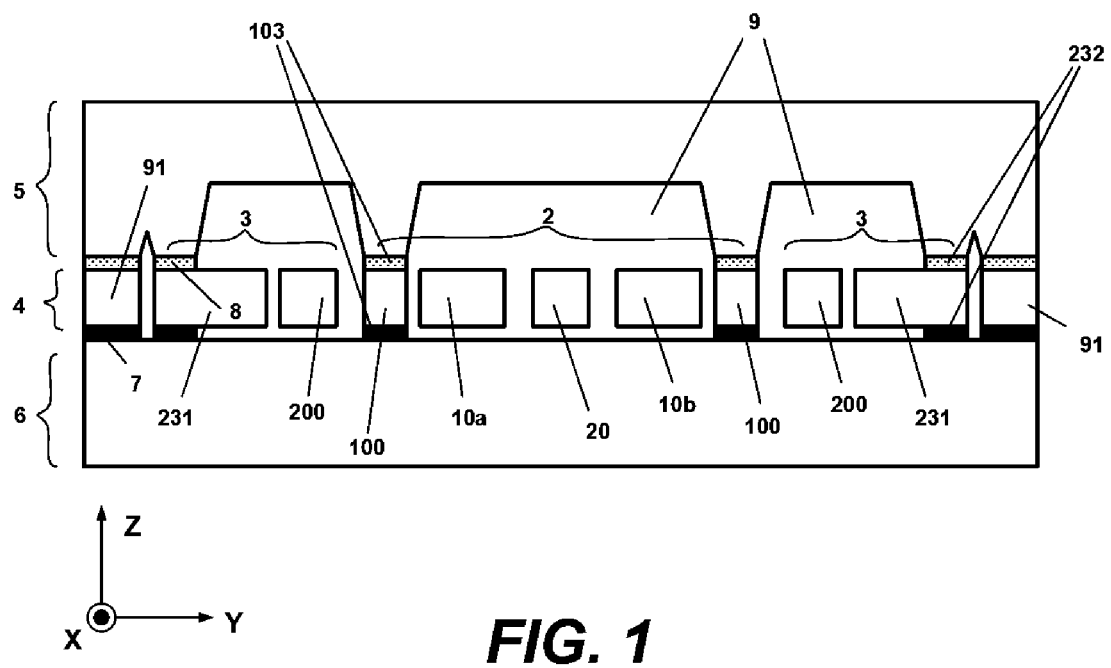
FIG. 1 illustrates a cross section of a Z-axis rate sensor according to one implementation.

FIG. 1 illustrates a cross-section of an angular velocity sensor assembly fabricated from a MEMS device layer 4, a cover wafer 5, and a reference wafer 6. In one implementation, sensing subassembly is implemented in the MEMS device layer which is parallel to the sensing plane. In one implementation, the sensing subassembly is attached to base plate 1 that is parallel to the plane and the sensing subassembly measures rate of rotation of base plate around the axis normal to the plane. In one implementation base plate may be reference wafer. In yet another implementation the base plate comprises reference wafer and cover wafer coupled via the device layer 4 which provides mechanical integrity of the sensor. Further, the sensor assembly provides a hermetic barrier between an ambient environment and a part of a device layer 4, where mechanical structure of the sensor is built. In one implementation, the device layer 4 includes a seal ring 91 to seal off the environment. Thus, in one implementation, the seal ring 91, reference wafer 6, and cover wafer 5 form a cavity 9, which is hermetically isolated from the environment. Pressure in the cavity 9 can be adjusted during the fabrication process. The device layer 4 and reference wafer 6 are further connected with electrically conductive material 7 and are used to bring electrical connections from the reference wafer 6 to the device layer 4. Further, the device layer 4 and cover wafer 5 are connected with an electrical insulator 8. In one implementation, the reference wafer 6 is an integrated circuit wafer and the electrically conductive material 7 is used to obtain electrical connections between a mechanical structure of the sensor and supporting electronics on CMOS wafer. Electrical and insulator connections 7 and 8, together with cover wafer 5 and reference wafer 6, may also be used to mechanically reinforce the angular velocity sensor's structure providing overall structural integrity of the sensor (e.g., through anchors 103, 232). Other examples of such anchors are discussed in greater detail below.

Z-axis Gyroscope

Figure 2A:
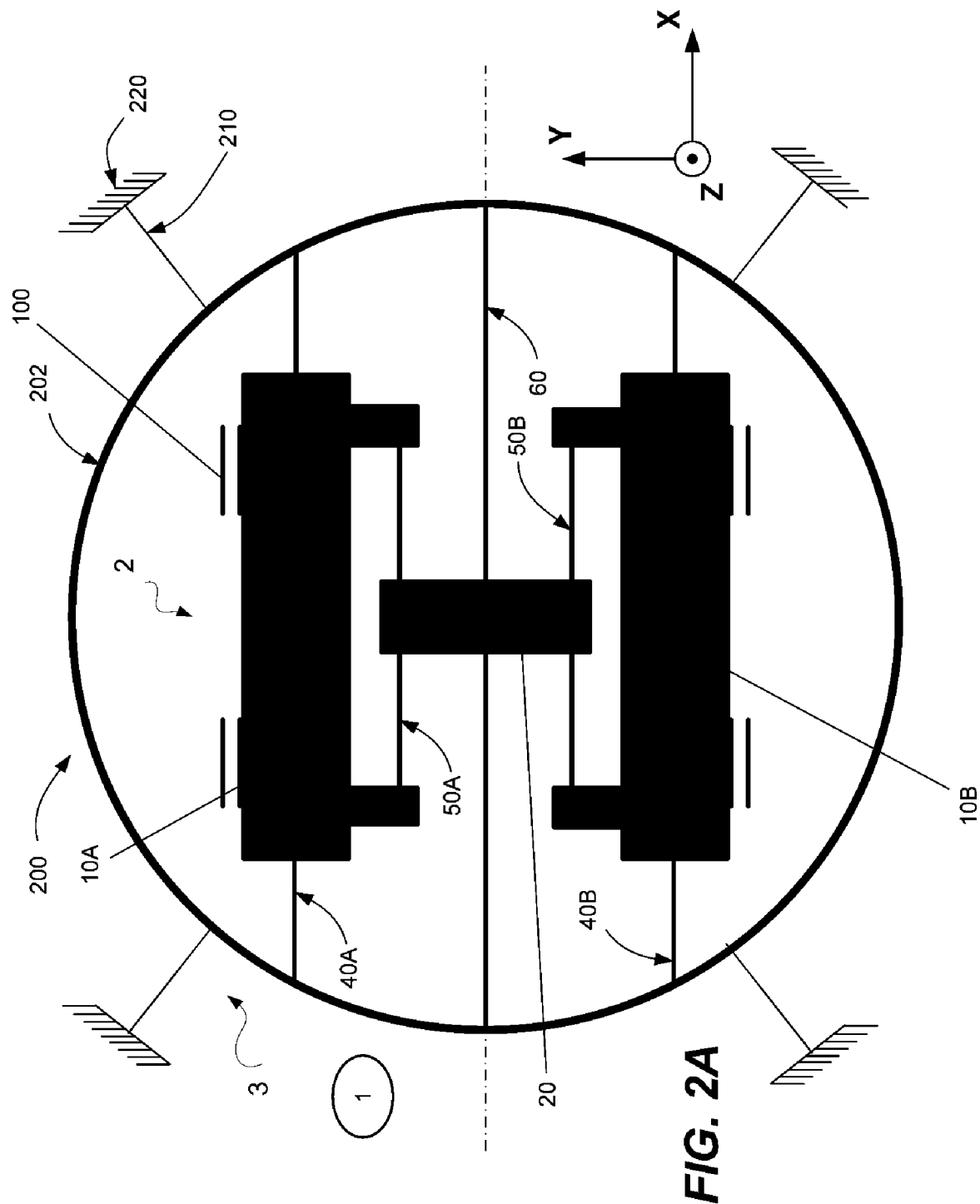
FIGS. 2A-2B illustrate a schematic diagram of a Z-axis rate sensor according to one implementation.
Figure 2B:
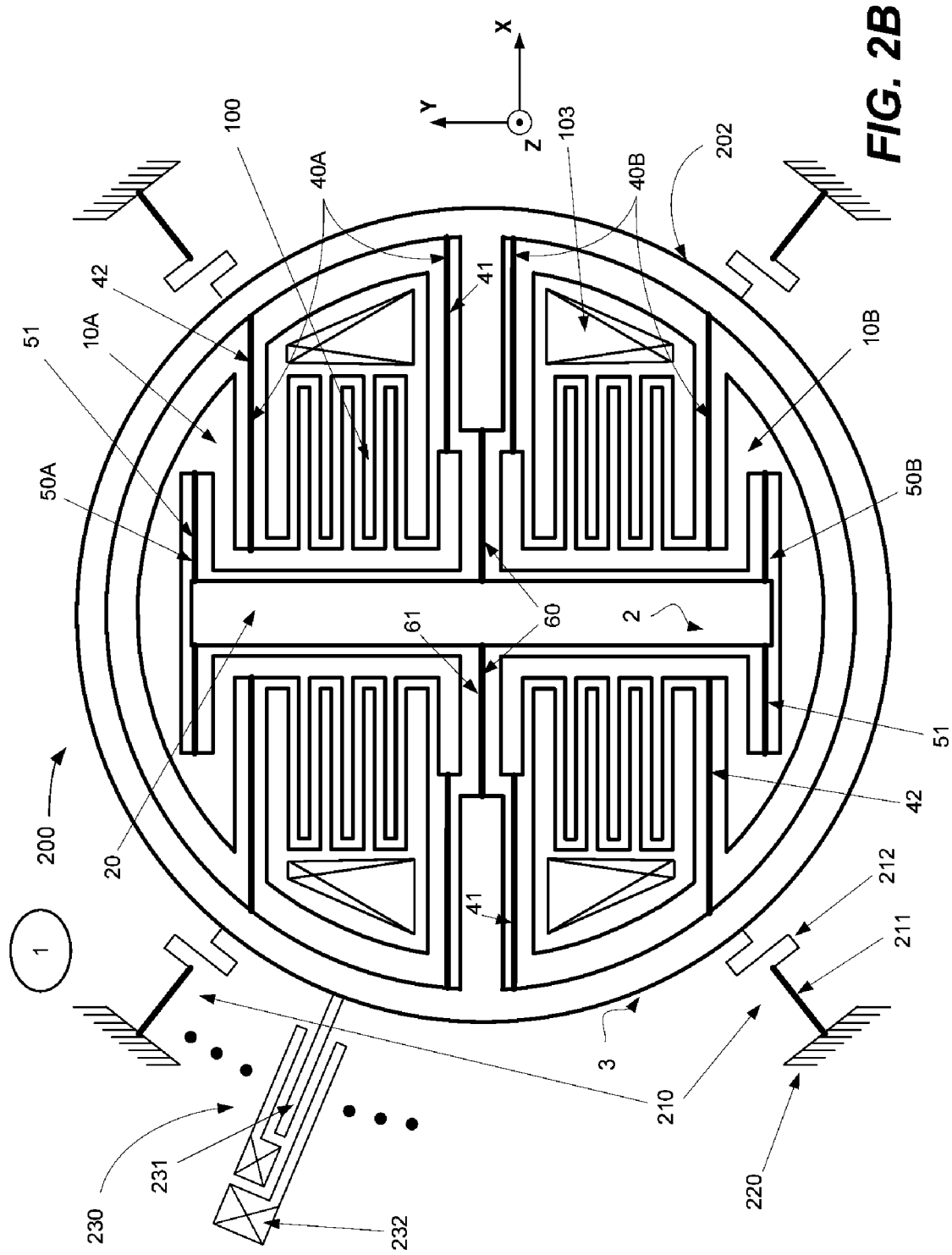

FIGS. 2A-2B illustrate a Z-axis rate sensor 200 in accordance with one implementation. Referring to both FIGS. 2A-2B, the Z-axis rate sensor 200 includes a drive system 2 enveloped by a sense system 3. In one implementation, the drive system 2 contains three masses—two proof masses 10A and 10B, and a linkage 20. In one implementation, the sense system 3 contains a frame comprising a sense ring 202. The linkage 20 is connected to proof masses 10A and 10B through spring systems 50A and 50B, respectively. The spring systems 50A, 50B each comprises two beams 51. The proof masses 10A and 10B are connected to the sense ring 202 through spring systems 40A and 40B. Each spring system 40A, 40B comprises two beams 41 and two beams 42. The linkage 20 and sense ring 202 are connected through a spring system 60 comprising two beams 61. The sense ring 202 is suspended to the base plate 1 (through anchor point 220) by spring system 210 comprising a plurality (in one implementation four) of sense springs 211 and stress isolation springs 212. Spring systems 40, 50, 60, 210 may generally contain complex spring structures. Further, the anchor 220 provides electrical contact to the mechanical structure, through connection 7. The plurality of anchors 220 are connected to wafers 5 and 6 through layers 7 and 8. The resulting assembly provides necessary structural integrity of the angular rate sensor.

The Z-axis rate sensor 200 further includes actuator, comprising plurality of drive electrodes 100. The drive electrodes 100 can be parallel plate or interdigitated comb electrodes. In one implementation, the drive electrodes 100 exert force on proof masses 10A and 10B, and are anchored to the base plate 1 through electrode anchors 103. In one implementation, the sense system 3 includes Coriolis sense electrodes 230 that each comprises a plurality of Coriolis Sense electrodes 231. Fixed portions of the Coriolis sense electrodes 230 are anchored to the base plate 1 through an anchor 232. In one implementation, the electrode anchors 103 and 232 are electrically connected to the reference wafer 6 through conductive layer 7.

In one implementation, the drive and sense masses 10A, 10B, 20, 202 and spring systems 40, 50, 60, 210 are formed within the device layer 4, which (in one implementation) comprises a single crystal silicon wafer. In one implementation, the drive electrodes 100 and the Coriolis sense electrodes 230 are also formed within device layer 4. In one implementation, electrode anchors 103, 113, 232, 242 drive anchors 90, and sense anchors 220 are sandwiched between cover wafer 5 and reference wafer 6 through the insulator layer 8 and conductive layer 7. This provides electrical connections for electrodes as well as overall structural integrity of the rate sensor.

In operation, the drive electrodes 100 actuate each of the proof masses 10A, 10B (e.g., in the Y-direction). In one implementation, the proof masses 10A, 10B vibrate with a phase shift of 180 degree with respect to each other. In one implementation the motion of the proof masses 10A, 10B can be sensed by drive-sense electrodes 110. The drive 100 and drive-sense electrodes 110 can be part of an oscillator circuit (not shown) in which the resonant frequency is determined by a mechanical resonance of the out-of-phase resonant mode of the proof mass, i.e. drive system. In this configuration, an oscillator can be built by amplifying the proof mass sense signal and feeding the proof mass sense signal to the actuator part with a proper phase.

When there is no rotation around the Z-axis which is normal to the base plate 1, the sense ring 202 is nominally stationary. If the base plate 1 is subject to a rotation about the input axis (the Z-axis), a Coriolis force on the vibrating proof masses 10A, 10B is generated. Since the proof masses 10A, 10B move with opposite phase, the Coriolis force acts on the proof masses 10A, 10B in opposite directions, e.g., +X on the proof mass 10A and −X on the proof mass 10B. The Coriolis force is transmitted to the sense ring 202 via the spring systems 40 and 60 that connect the sense ring 202 to the proof masses 10A, 10B. As a result, the sense ring 200 starts oscillating together with the proof masses 10A, 10B. In one implementation, the motion of the sense ring 202 is detected by capacitive transducer, comprising plurality of Coriolis sense electrodes 230. The capacitive Coriolis sense electrodes can be parallel plate or comb structure (represented in FIG. 3 by Coriolis sense electrode system 230 comprising plurality of Coriolis sense electrodes 231). The fixed part of electrodes 231 is anchored to the base plate 1 through anchor 232.

Design with 5 Masses and Mechanical Amplitude Amplification

Figure 3A:
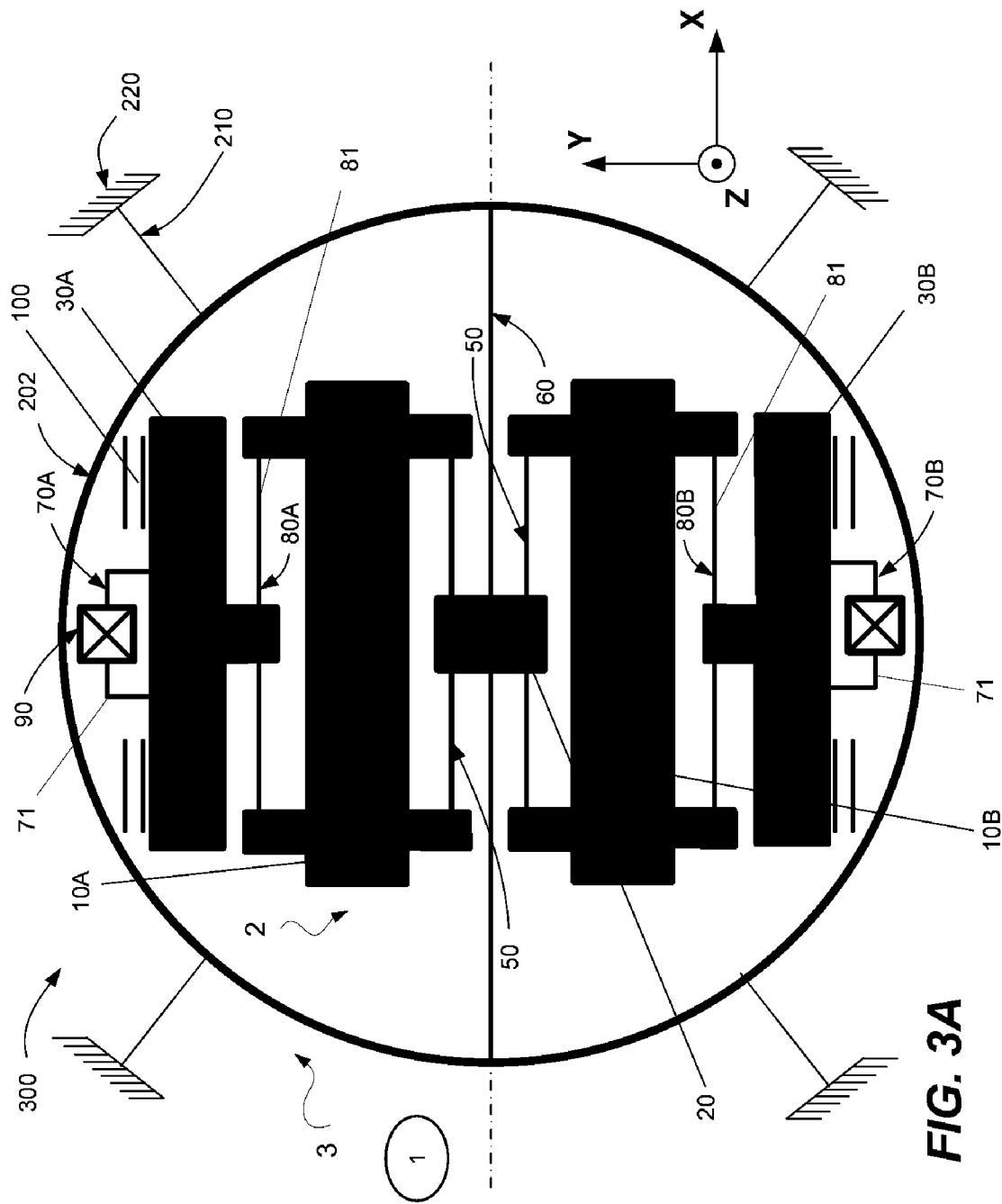
FIGS. 3A-3B illustrate a schematic diagram of a Z-axis rate sensor according to one implementation.
Figure 3B:
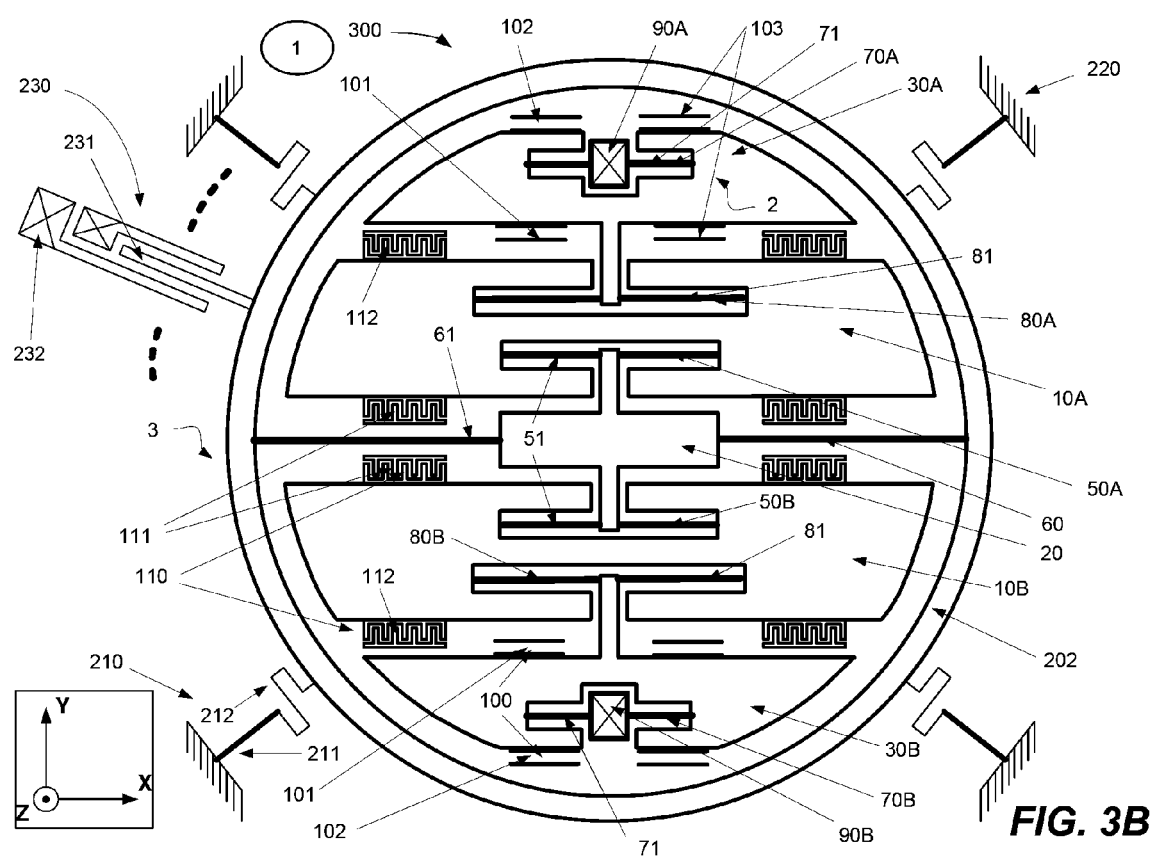

FIGS. 3A-3B illustrate a Z-axis rate sensor 300 in accordance with one implementation. Referring to both FIGS. 3A-3B, the Z-axis rate sensor 300 includes a drive system 2 enveloped by a sense system 3. The drive system 2 contains five masses—two proof masses 10A and 10B, two actuator masses 30A, 30B, and a linkage 20. The sense system 3 contains only one mass—a sense frame, comprising a sense ring 202.

In one implementation, the linkage 20 is connected to proof masses 10A and 10B through spring systems 50A and 50B, respectively. The spring systems 50A, 50B each comprising two beams 51. The linkage 20 and sense ring 202 are connected through spring system 60 comprising two beams 61. The actuator masses 30A, 30B are connected to the proof masses 10A and 10B through spring systems 80A and 80B. Each of the spring systems 80A and 80B comprise two beams 81. The actuator masses 30A, 30B are further suspended to the base plate 1 through spring systems 70A, 70B and anchor points 90A and 90B. Each of the spring systems 70A, 70B comprise two beams 71. The sense ring 202 is suspended to the base plate 1 by a spring system 210 and plurality of anchors 220. The spring systems 50, 60, 70, 80, 210 may generally comprise complex spring structures.

The Z-axis rate sensor 300 further includes an actuator comprising plurality of drive electrodes 100. The drive electrodes 100 can be parallel plate or interdigitated (comb) electrodes. The drive electrode 100 may comprise two electrodes of opposite polarity—i.e., electrodes 101, 102. As shown in FIG. 3B, the actuator masses 30A, 30B are actuated with, e.g., two sets of parallel plate electrodes 101, 102. The first set of electrodes 101 is used to pull actuator masses 30A and 30B towards each other while second set of electrodes 102 is used to push actuator masses 30A and 30B away from each other. An actuation signal applied on electrodes 101, 102 should be applied in out-of-phase fashion yielding differential actuation. Although the Z-axis rate sensor 300 is shown including differential actuation, single-sided actuation can also be implemented. The drive electrodes 100 exert force on actuator masses 30A and 30B. When the actuator masses 30A and 30B move, the motion is transferred to the proof mass 10A, 10B through spring system 80A, 80B. Motion of the proof masses 10A, 10B is substantially larger than the motion of the actuator mass 30A, 30B. This is achieved through shaping the drive resonant mode by adjusting each of spring system 70A, 70B, 80A, 80B, 50A, 50B. This feature enables use of parallel plate electrodes for actuation. In that case actuator mass 30 is driven at low amplitude but proof mass may be oscillated at substantially higher amplitude relative to actuator. The drive electrodes 100 are anchored to the base plate 1 through electrode anchors 103.

In one implementation, the motion of the proof masses 10A, 10B is detected through a transducer comprising drive-sense electrodes 110, in which each drive-sense electrode 110 comprises two electrodes 111, 112 having an opposite polarity. Sense electrodes having an opposite polarity enable differential sensing. The sensed signal may be shifted in phase substantially close to 90 degree and applied to the actuator masses 30A, 30B. This will oscillate the actuator masses 30A, 30B and proof masses 10A and 10B. As noted above, although a differential pick-up scheme is depicted in FIG. 3B, single-sided detection can also be implemented.

In one implementation, Coriolis motion is modulated on drive mode and is transmitted to the frame comprising the sense ring 202 at the drive frequency through spring system 60. In one implementation, ring motion may be amplified by the presence of a resonant mode associated with the sense subsystem 3. The frequency of the drive mode should be substantially close to sense mode therefore improving transfer of Coriolis-generated torque to the rotation of the sense ring 202. Motion of the sense ring 202 is detected through a transducer comprising Coriolis sense electrode system 230, which comprises a plurality of Coriolis sense electrodes 231.

In one implementation, the drive and sense masses 10A, 10B, 20, 30A, 30B, 202, spring systems 50, 60, 70, 80, 210 and electrodes 100,110 and 230 are formed within a device layer 4 that comprises a single crystal silicon wafer. In one implementation, the electrode anchors 103, 113, 232, 242 drive anchors 90, and sense anchors 220 are sandwiched between cover wafer 5 and reference wafer 6 through the insulator layer 8 and conductive layer 7. This provides electrical connections for electrodes as well as overall structural integrity of the rate sensor.

Another Implementation of a Z-Axis Rate Sensor

Figure 4:
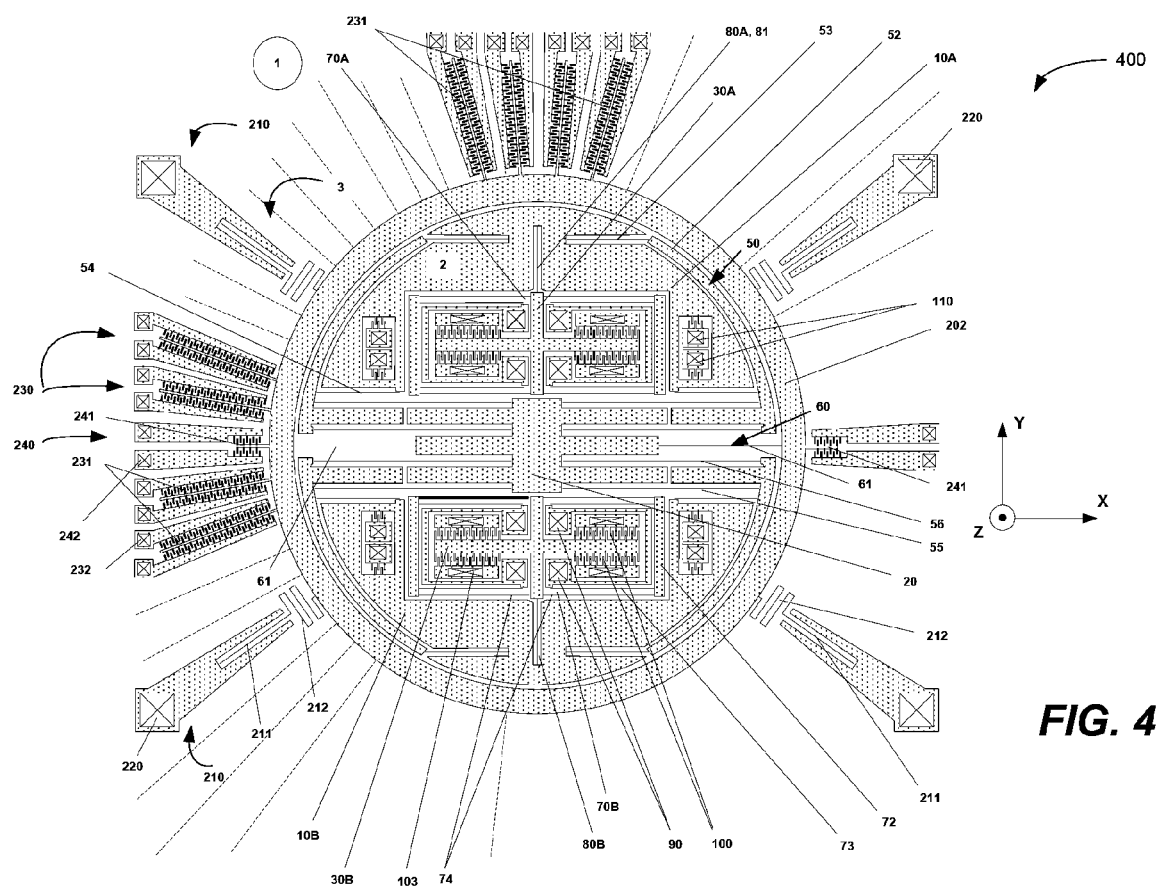
FIGS. 4-7 illustrate a schematic diagram of a Z-axis rate sensor of FIG. 3A according to one implementation.

FIGS. 4-7 illustrate one implementation of a MEMS sensing device (e.g., a Z-axis rate sensor 400). In particular, FIG. 4 shows a top view of the rate sensor 400. The Z-axis rate sensor 400 is built within actuator layer 4 (see FIG. 1.). In one implementation, the Z-axis rate sensor 400 is configured to measure a rate of rotation of base plate 1 around the Z-axis. The Z-axis rate sensor 400 contains two subsystems—a drive subsystem 2, and a sense subsystem 3. In one implementation, drive subsystem 2 is enveloped by the sense subsystem 3. In one implementation drive system is oscillated along the Y-axis symmetrically, in out-of-phase fashion. If the base plate 1 has a rate of rotation around the Z-axis, a Coriolis force acts on the oscillating drive subsystem 2 and generates torque around the Z-axis. The momentum is transferred to the sense subsystem 3 and the amplitude of oscillatory motion of the sense subsystem 3 is proportional to the rate of rotation.

General Electromechanical Structure

Figure 5:
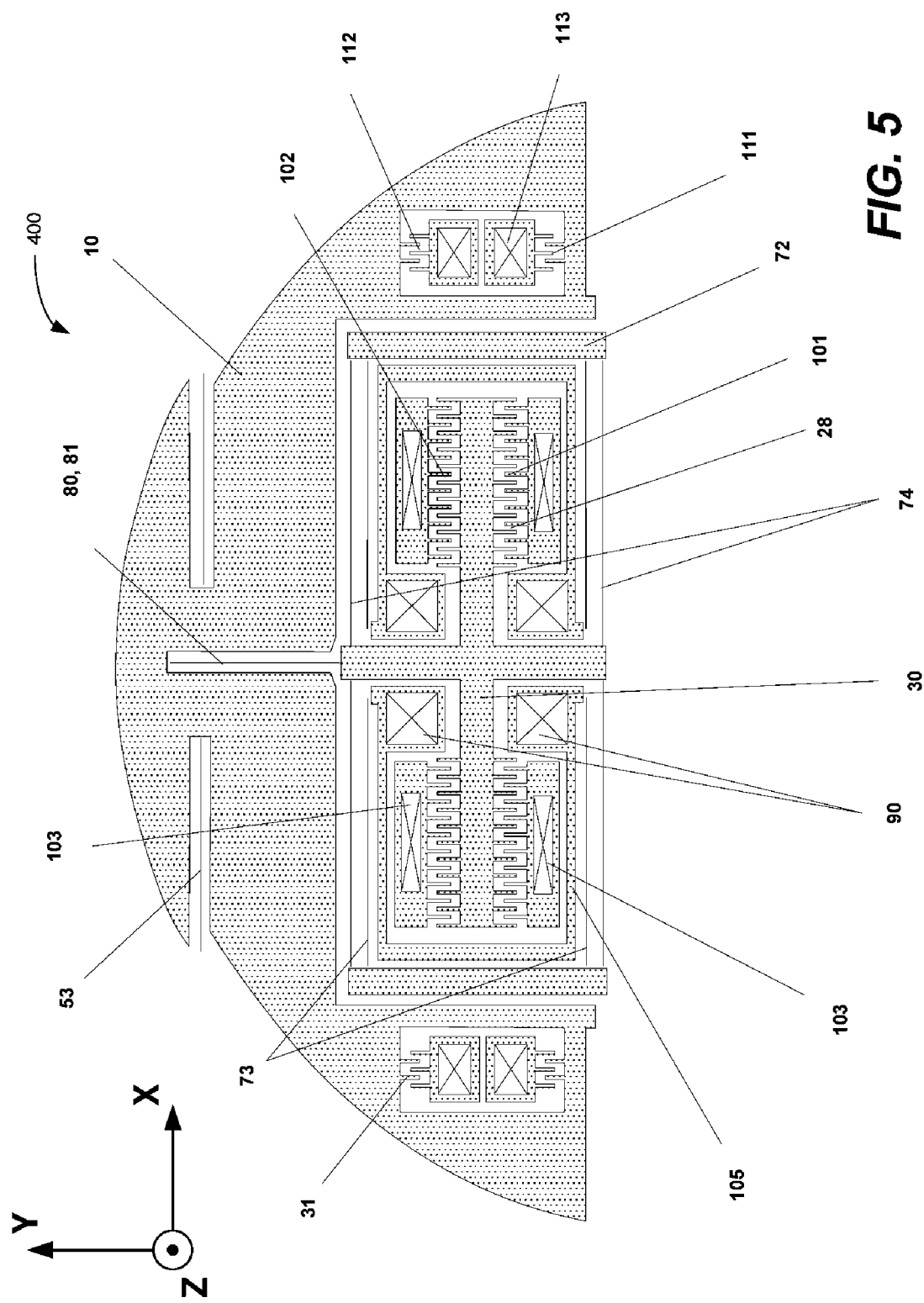

Referring to FIGS. 4 and 5, in one implementation, the drive subsystem 2 contains five masses and seven types of spring systems as follows—proof mass 10A, 10B, actuator mass 30A, 30B and, linkage 20, spring systems 50A, 50B, 60, 70A, 70B, 80A and 80B. Further, each spring system 50 comprises two springs 53, two springs 54, two springs 55, two springs 56 and two masses 52. Spring system 60 comprises two springs 61. Each spring system 70 comprises four beams 73, four beams 74 and two masses 72. Each spring system 80 comprises single beam 81.

Drive Electromechanical Structure—Proof Mass/Linkage

Figure 6:
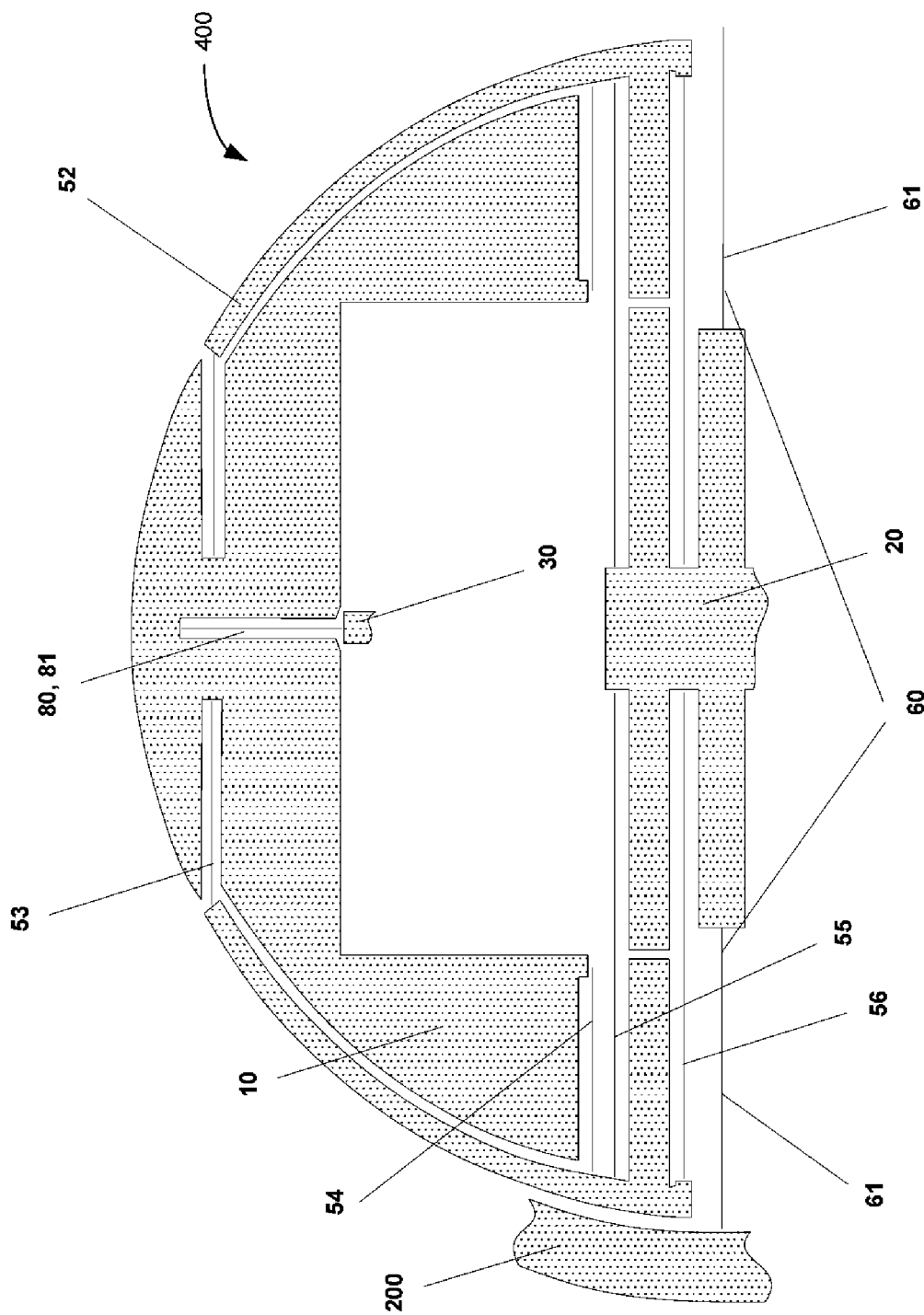

Referring to FIGS. 5-6, the proof mass 10 and linkage 20 are connected through spring system 50. Specifically, springs 53-54 connect the proof mass 10 to a lever arm 52 and springs 55-56 connect the lever arm 52 to the linkage 20. In one implementation, the spring system 50 is compliant in the Y-direction which permits substantial motion of the proof mass 10 relative to the linkage 20. In one implementation, the spring system 50 is substantially stiff to rotation around the Z-axis and, therefore, any torque generated on the proof mass 10 is transferred to the linkage 20. Torque from the linkage 20 is then transferred to the ring 200 through a spring system 60.

In one implementation, the actuator mass 30 is connected to the base plate 1 through actuator springs system 70 at the anchoring point 90. In one implementation, the actuator spring system 70 is compliant to permit translation along the Y-axis and allow substantial movement. In one implementation, the actuator spring system 70 is stiff in x-direction movement or rotation motion in z axis in order to prevent the actuator mass 30 from any rotation and constraint drive mass 30 to motion in y-direction only. The actuator mass 30 and proof mass 10 are connected through spring system 80. In one implementation, the spring system 80 is stiff in the Y-direction which permits motion of the proof mass 10 and actuator mass 30 along the Y-axis to be substantially similar and coupling between them very efficient. In one implementation, the spring system 80 is compliant to any motion in the X-direction and rotation around the Z-axis, which ensures that no translation along X or rotation around Z axis motion of the proof mass 10 is transferred back to the actuator mass 30 or vise-versa.

Figure 7:
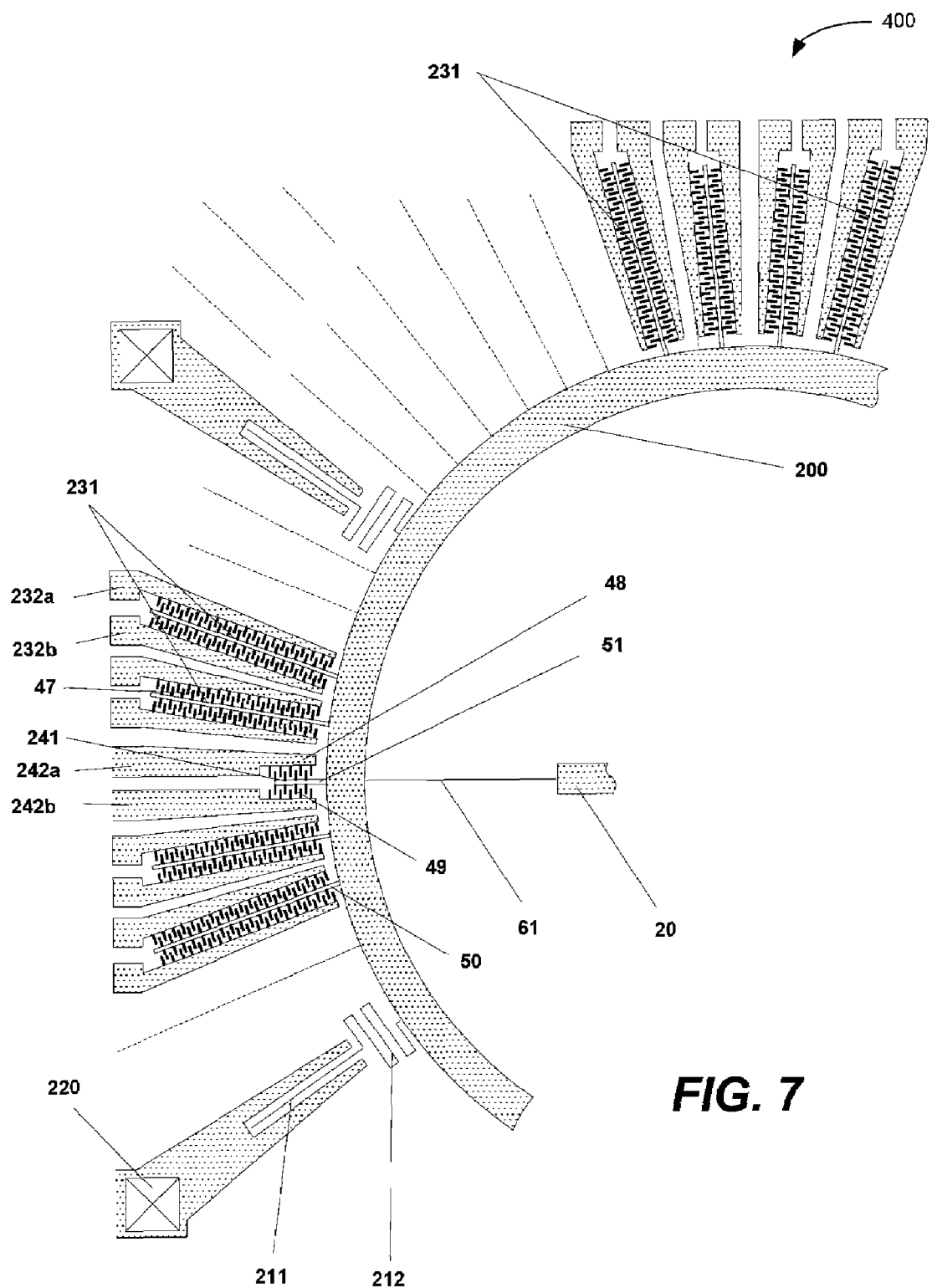

Referring to FIGS. 4 and 7, the sense subsystem 3 contains a frame, comprising the ring 202 with sense spring system 210 with plurality of springs 211 and stress isolation springs 212. Each spring contains a sense spring 211 and a stress isolation spring 212 for external stress relief. The sense springs 211 are anchored to the base plate 1 at sense anchor points 220. In one implementation, the ring 202 is configured as a circular-shaped structure and encloses the drive subsystem 2 entirely. The sense ring 202, also referred to herein as a frame, can be configured to have any other suitable shape—e.g., a rectangular shape. The drive subsystem 2 and sense subsystem 3 are flexibly coupled through transmission spring system 60, comprising two springs 61. This coupling enables independent rotation around Z axis of the ring 202, and proof masses 10 and linkage 20.

Referring to FIGS. 4 and 5, an actuator comprising drive electrodes 100 is shown—i.e., inner drive electrodes 101 and outer drive electrodes 102. The inner drive electrodes 101 are electrically connected together, and the outer drive electrodes 102 are electrically connected together. If voltage is applied on the inner electrodes 101, a generated force causes both actuator masses 30A and 30B to move inwards, towards each other. If a voltage is applied on the outer drive electrodes 102, a generated force causes both actuator masses 30A and 30B to move outwards, away from each other. Thus, a voltage applied across the drive electrodes 101 and 102 will cause the actuator masses 30A and 30B to move in an opposite direction along the Y-axis, in direction that depends on which electrode the voltage is applied. Each drive electrode 101 and 102 contains: an inter-digitated electrode anchor 103 with fixed comb fingers (in one implementation, the anchor is connected electrically the reference wafer 6 and act as the electrical interconnect); movable fingers 28, attached to the actuator; and a shield 105 for preventing the fixed electrode from exerting a force on the inner actuator springs 73.

Motion of the proof mass 10 can be detected by the transducer comprising drive-sense electrodes 110—e.g., inner drive sense electrodes 111 and outer drive sense electrodes 112. In one implementation, there are four drive sense electrodes 111 and 112. In one implementation, the inner drive sense electrodes 111 are electrically connected together, and the outer drive sense electrodes 112 are electrically connected together. When the proof mass 10 moves along the Y-axis, motion of the proof mass 10 causes the inner drive sense electrodes 111 and the outer drive sense electrodes 112 to simultaneously change capacitance. In one implementation, a difference in change in capacitance is linearly proportional to the motion of the proof mass 10. As shown in FIG. 4, in one implementation, each drive sense electrode 110 contains: inter-digitated electrode anchor with fixed anchor 113, and movable fingers 31 attached to the mass 10. In one implementation, the anchor provides electrical connection to reference wafer 6 as well as mechanical connection to the base plate 1.

As shown in FIG. 7, the Z-axis rate sensor 400 includes a transducer comprising plurality of Coriolis sense electrodes 231 around the frame, comprising ring 202. The purpose of Coriolis sense electrodes 231 is to sense the rotation of the ring 202. In one implementation, each Coriolis sense electrode 231 includes: an inter-digitated electrode anchor with fixed fingers 232 (in one implementation, two polarities of motion are sensed differentially through fingers 232a, 232b), and the anchor, anchor providing electrical connection to reference wafer 6; and movable fingers 47, attached to a comb electrode spine 50. In one implementation, the Z-axis rate sensor 400 further includes an actuator comprising two comb drive self test electrodes 241 attached to the ring 202. In one implementation, each comb drive self test electrode 241 includes: an inter-digitated electrode anchor with fixed fingers 242 (in one implementation, two polarities of motion are sensed differentially through fingers 242a, 242b, and the anchor provides electrical contact); and movable fingers 49 attached to a comb electrode spine 51. The ring 202 is further connected to the base plate 1 through springs 211-212 at an anchoring point 220.

In one implementation, the drive and sense masses 10A, 10B, 20, 30A, 30B, 202, spring systems 50, 60, 70, 80, 210 and electrodes 100,110 and 230 are formed within a device layer 4 that comprises a single crystal silicon wafer. In one implementation, the electrode anchors, drive anchors and sense anchors are sandwiched between cover wafer 5 and reference wafer 6 through the insulator layer 8 and conductive layer 7. This provides electrical connections for electrodes as well as overall structural integrity of the rate sensor.

Operation of Z-axis Rate Sensor

Figure 8B:
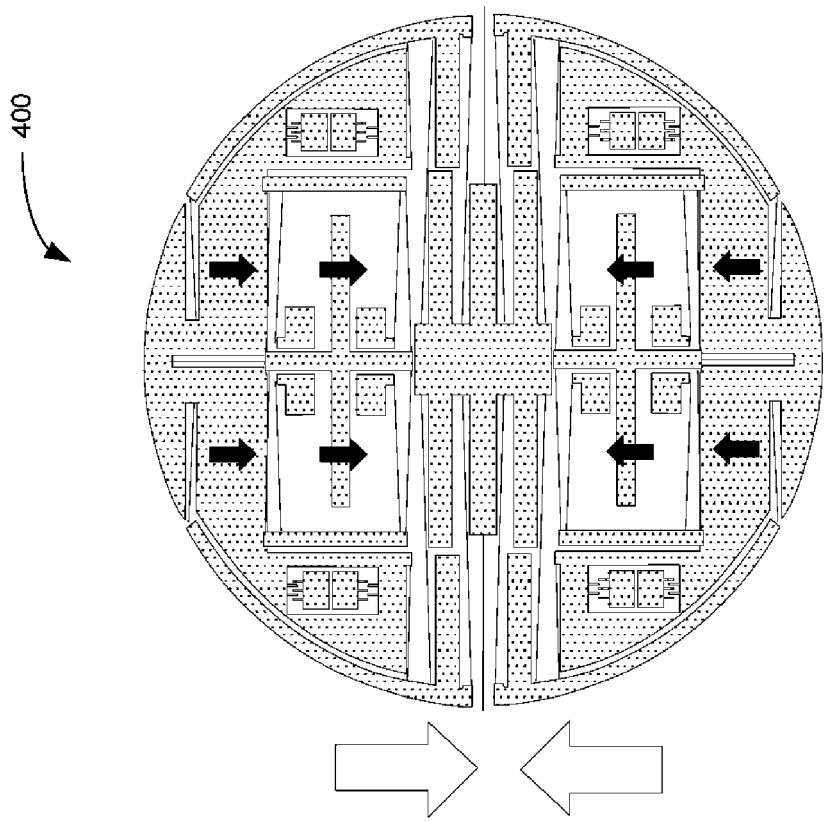
FIGS. 8A-8B illustrate oscillations of an actuator mass within the Z-axis rate sensor of FIGS. 4-7 in accordance with one implementation.
Figure 8A:
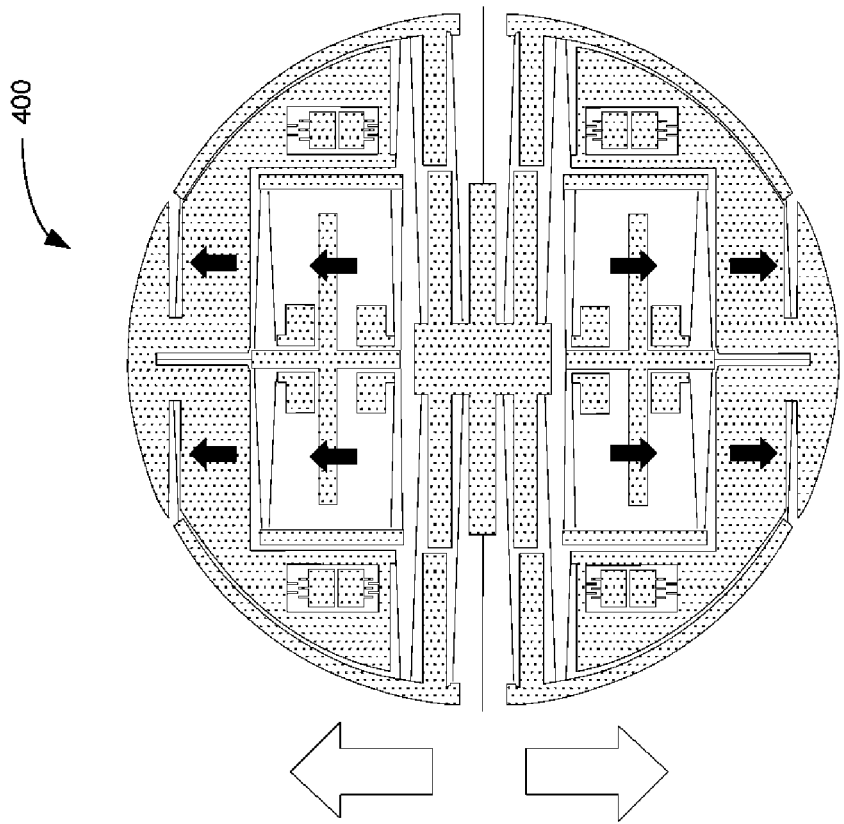

The drive subsystem 2 can be oscillated in anti-phase fashion along the Y-axis through plurality of drive electrodes 100. By alternating electric voltages between each set of inner drive electrodes 101 and outer drive electrodes 102, the actuator masses 30 are induced to oscillate—either moving towards each other or away from each other as shown in FIGS. 8A-8B. Proof masses 10A and 10B are rigidly attached to the actuator masses 30A and 30B through the spring system 80A and 80B each comprising beam 81. Rigid link enables proof mass to move with the same amplitude and in phase with actuator masses. Ideally, if there is no Coriolis force acting on proof masses, linkage 20 does not move.

In addition, a driving force is applied at a frequency corresponding to the modal frequency of anti-phase drive mode (FIGS. 8A-8B) encouraging the motion along the Y-direction. In one implementation, the drive resonance peak amplifies motion and so that substantially large mechanical amplitudes can be achieved using substantially smaller sized driving electrodes. The amplitude of Y motion may be controlled.

Motion of the proof mass 10 can be detected by plurality of drive-sense electrodes 110. In one implementation, proof mass position signal can be shifted 90 degrees and fed back to the drive electrodes therefore establishing oscillation loop with resonant frequency determined by the mechanical resonant frequency of the drive system.

Anti-phase vibrations of proof masses 10 induce Coriolis force with opposite sign on proof masses 10A and 10B. This causes proof masses to move along X axis in opposite direction. If Z-rotational stiffness of the spring system 50 is high, the proof masses' motion generates torque on the linkage 20. Higher the rotational stiffness, more efficiently motion of the proof masses 10 couples into linkage 20. Effectively, proof masses 10, linkage 20 and spring system 50 represent rigid body with respect to motion around Z axis. At the same time, translational stiffness of the spring system 50 in Y direction should be compliant so that the substantial amplitude of drive oscillations can be established. Also, spring system 80 comprising single beam is compliant for translation along X and rotation around Z axis so Coriolis force does not get transferred back to the actuator masses 30.

Coriolis-induced rotation of the linkage 20 is transferred to the ring 202 via spring system 60 comprising a pair of springs 61. Ring 202 vibrates at drive frequency at amplitude proportional to the angular rate. In one implementation, the ring 202 is enveloped by electrode sense system 230, comprising plurality of comb sense electrodes 231, and rotation of the ring 202 can be detected by Coriolis sense electrodes 231. In one implementation, there are a total of 48 sense electrodes 231. The ring 202 can also be oscillated by applying a voltage on self-test electrodes 241.

Figure 9:
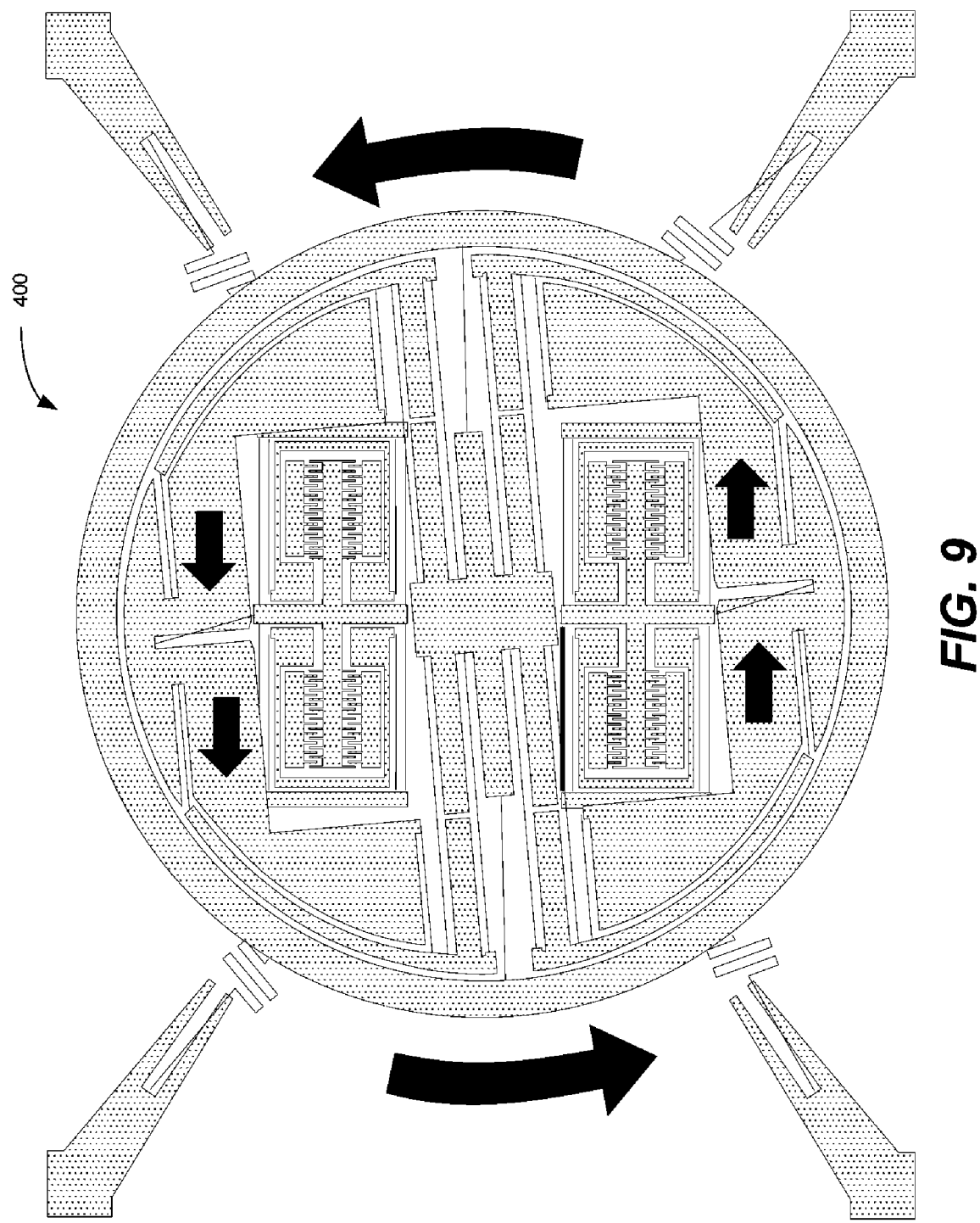
FIG. 9 illustrates motion of a ring within the Z-axis rate sensor of FIGS. 4-7 in accordance with one implementation.

In one implementation, the ring motion induced by Coriolis force is proportional to the rate of rotation of the base plate 1. The resulting ring motion is illustrated in FIG. 9. In one implementation, the ring motion occurs at a drive frequency. In one implementation, ring motion may be amplified by the presence of the sense mode forming the resonant peak associated with the sense subsystem 3. In one implementation, the frequency of the drive mode should be substantially close to the frequency of the sense mode therefore improving transfer of Coriolis-generated torque to the rotation of the sense ring 202. The motion of the sense ring 202 is detected through Coriolis sense electrode system 230, which comprises a plurality of Coriolis sense electrodes 231.

Figure 10:
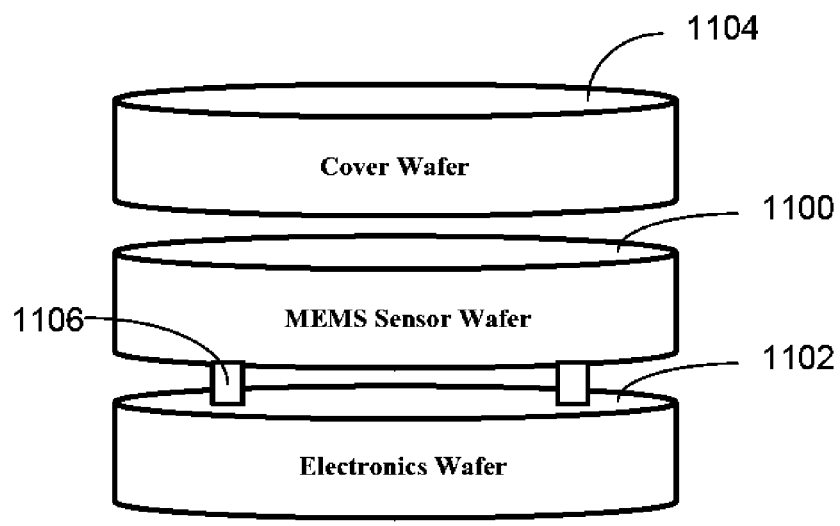
FIG. 10 illustrates a MEMS sensor wafer and an electronics wafer according to one implementation.

In one implementation, the components of a Z-axis rate sensor are respectively integrated onto a MEMS sensor wafer 1100 (device layer 4 from FIG. 1) and an electronics (CMOS) wafer 1102 (reference wafer 6 from FIG. 1), and cover wafer 1104 (cover wafer 5 from FIG. 1.), as shown in FIG. 10. More specifically, in one implementation, the proof masses, drive and sense electrodes are integrated onto the MEMS sensor wafer 1100, and the drive and sense electronics are integrated onto the electronics wafer 1102. In one implementation, the MEMS sensor wafer 1100 is bonded to the electronics wafer 1102. Any suitable bonding techniques can be used to bond the MEMS sensor wafer 1100 to the electronics wafer 1102, such as the bonding techniques described in pending U.S. patent application Ser. No. 11/084,296, entitled "Method of Fabrication of AL/GE Bonding in a Wafer Packaging Environment and a Product Produced Therefrom", which is incorporated by reference herein. In one implementation, components integrated onto the MEMS sensor wafer 1100 are electrically connected to components (e.g., CMOS electronics) associated with the electronics wafer 1102 through electrical interconnects 1106.

Various implementations of a Z-axis rate sensor have been described. Nevertheless, various modifications may be made to the implementations. For example, implementations of a Z-axis rate sensor can include a different number of electrodes and/or springs than as shown in the implementations above and still achieve desirable results. In addition, X/Y/Z gyros can be integrated into same device by using techniques discussed above. Accordingly, many modifications may be made without departing from the scope of the present invention.

What is claimed is:

1. An angular rate sensor configured to measure angular velocity about an axis that is normal to a sensing plane of the angular rate sensor, the angular rate sensor comprising:
    a sensing subassembly comprising
        a substantially planar frame parallel to the sensing plane;
        a first proof mass disposed in the sensing plane;
        a second proof mass disposed in the sensing plane laterally to the first proof mass; and
        a linkage within the frame and connected to the frame, the linkage being connected to the first proof mass and to the second proof mass;
    an actuator for driving the first proof mass and the second proof mass into oscillation along a drive axis in the sensing plane, the actuator to drive the first proof mass and the second proof mass 180 degrees out-of-phase;
    a first transducer to sense motion of the frame in response to a Coriolis force acting on the oscillating first proof mass and the oscillating second proof mass in the sensing plane; and
    a base plate which is parallel to the sensing plane and to which the sensing subassembly is attached.

2. The sensor of claim 1, wherein:
    the actuator comprises an electrostatic actuator; and
    the first transducer comprises a capacitive sensor.

3. The sensor of claim 2, wherein the capacitive sensor comprises a plurality of interdigitated comb electrodes configured to differentially measure motion of the frame.

4. The sensor of claim 2, wherein the capacitive sensor comprises a plurality of parallel plate electrodes configured to differentially measure motion of the frame.

5. The sensor of claim 1, further comprising a plurality of flexures configured to connect the base plate to the frame such that the frame is able to rotate about a central axis normal to the sensing plane.

6. The sensor of claim 1, wherein:
    a coupling between the linkage and the first proof mass and a coupling between the linkage and the second proof mass are compliant along the drive axis in the sensing plane; and
    a coupling between the linkage and the frame is compliant along the drive axis in the sensing plane.

7. The sensor of claim 1, wherein the first proof mass and the second proof mass are coupled to the frame.

8. The sensor of claim 1, wherein the sensing subassembly further includes:
    a first actuator mass within the frame and coupled to the first proof mass; and
    a second actuator mass within the frame and coupled to the second proof mass;
    wherein the actuator further comprises a first actuator and a second actuator, wherein the first actuator drives the first actuator mass and the second actuator drives the second actuator mass, and wherein the first actuator and second actuator respectively drive the first proof mass and the second proof mass into oscillation indirectly through the first actuator mass and the second actuator mass.

9. The sensor of claim 8, wherein the first actuator mass is coupled to the base plate and the second actuator mass is coupled to the base plate.

10. The sensor of claim 8, wherein the first actuator mass is coupled to the frame and the second actuator mass is coupled to the frame.

11. The sensor of claim 8, wherein:
    the first actuator mass is rotatable around a first axis normal to the sensing plane and is able to move along the drive axis in the sensing plane; and
    the second actuator mass is rotatable around a second axis normal to the sensing plane and is able to move along the drive axis in the sensing plane.

12. The sensor of claim 11, wherein a coupling from the first proof mass to the linkage and a coupling from the second proof mass to the linkage are compliant with respect to the rotation around the axis normal to the plane.

13. The sensor of claim 11, further comprising a first spring system and a second spring system configured to respectively amplify a substantially small oscillation of the first actuator mass and the second actuator mass into a substantially larger oscillation of the first proof mass and the second proof mass.

14. The sensor of claim 8, wherein:
    the first actuator mass and the second actuator mass are able to substantially move only along the drive axis,
    wherein the first proof mass is rigidly coupled to the first actuator mass along the drive axis such that the first actuator and the first proof mass move substantially together, and the second proof mass is rigidly coupled to the second actuator mass along the drive axis such that the second actuator and the second proof mass move substantially together, and
    wherein the first proof mass is coupled to the first actuator mass such that the first proof mass is rotatable around a central axis normal to the sensing plane, and the second proof mass is coupled to the second actuator mass such that the second proof mass is rotatable around the central axis.

15. The sensor of claim 14, wherein a coupling from the first proof mass to the linkage and a coupling from the second proof mass to the linkage is rigid with respect to the rotation around the central axis normal to the sensing plane.

16. The sensor of claim 1, wherein the actuator comprises a plurality of differential drive electrodes.

17. The sensor of claim 1, wherein the actuator comprises a plurality of single-ended drive electrodes.

18. The sensor of claim 1, wherein the sensing subassembly further comprises a second transducer to sense the amplitude of the oscillation of the first proof mass and the second proof mass and provide feedback to the actuator for driving the oscillation of the first proof mass and the second proof mass at a resonant frequency.

19. The sensor of claim 18, wherein the second transducer is capacitive.

20. The sensor of claim 1, wherein the frame is substantially circular.

21. The sensor of claim 1, wherein the frame is substantially rectangular.

22. The sensor of claim 1, wherein the base plate comprises a single crystal silicon wafer.

23. The sensor of claim 22, wherein the base plate comprises an integrated CMOS wafer having drive and sense electronics.

24. The sensor of claim 23, further comprising a cover plate including a layer of insulator, the cover plate being attached to the sensing subassembly to form a complete hermetic seal enclosure of the first proof mass and the second proof mass.

25. The sensor of claim 24, further comprising anchors to anchor the sensing subassembly to the cover plate.

26. The sensor of claim 25, further comprising a seal ring that hermetically seals the sensing subassembly to the CMOS wafer via eutectic or metal bonding while maintaining a fixed gap between the base plate and the CMOS wafer.

27. The sensor of claim 26, further comprising a plurality of stand offs that permit creation of electrical interconnects from the sensing subassembly to the CMOS wafer, the electrical interconnects being formed by the eutectic or metal bonding.

28. The sensor of claim 27, wherein the eutectic or metal bonding comprises an aluminum and germanium alloy.

\* \* \* \* \*